United States Patent [19]

Klein

[11] 3,963,639
[45] June 15, 1976

[54] FLUORESCENT LAMP AND METHOD FOR THE MANUFACTURE THEREOF

[75] Inventor: Richard M. Klein, Framingham, Mass.

[73] Assignee: GTE Laboratories Incorporated, Waltham, Mass.

[22] Filed: Oct. 23, 1974

[21] Appl. No.: 513,804

Related U.S. Application Data

[62] Division of Ser. No. 364,568, May 29, 1973, Pat. No. 3,890,522.

[52] U.S. Cl. .............................. 252/301.36; 427/67; 427/157
[51] Int. Cl.² .................................. C09K 11/08
[58] Field of Search ............. 252/301.2 R, 301.3 R; 427/157, 67; 313/485, 486

[56] References Cited
UNITED STATES PATENTS

| | | | |
|---|---|---|---|
| 3,055,767 | 9/1962 | Quirk | 252/301.3 R |
| 3,310,418 | 3/1967 | Friedman et al. | 427/67 |
| 3,424,605 | 1/1969 | Beaumont et al. | 427/67 X |
| 3,551,180 | 12/1970 | Margolis | 427/67 |

FOREIGN PATENTS OR APPLICATIONS

| | | | |
|---|---|---|---|
| 457,440 | 3/1970 | Japan | 427/67 |
| 834,024 | 5/1960 | United Kingdom | |

*Primary Examiner*—John H. Mack
*Assistant Examiner*—Aaron Weisstuch
*Attorney, Agent, or Firm*—Irving M. Kriegsman

[57] ABSTRACT

A fluorescent lamp having a phosphor coating on the inside surface of the tubular glass envelope, the phosphor coating comprising finely divided phosphor particles coated with a glassy phosphate material. The lamp is prepared by providing an aqueous slurry of the phosphor particles in a solution containing a material yielding a phosphate glass upon firing, coating the interior envelope walls with the aqueous suspension, and firing the phosphor coating at a temperature which promotes the formation of the phosphate glass coating about the particulate phosphor material. A suitable phosphate glass-yielding material is ammonium dihydrogen phosphate, and phosphor coatings produced therewith have been found to have improved adherence to the envelope walls.

5 Claims, No Drawings

FLUORESCENT LAMP AND METHOD FOR THE MANUFACTURE THEREOF

This is a division, of application Ser. No. 364,568 filed May 29, 1973 now U.S. Pat. No. 3,890,522.

BACKGROUND OF THE INVENTION

This invention relates to fluorescent lamps and to methods for the fabrication thereof. More particularly, this invention relates to fluorescent coatings applied to the interior surfaces of the envelopes of such lamps, and to methods for applying such fluorescent coatings. Specifically, this invention relates to aqueous suspensions of phosphor particles, and the improvement in the adherence of fluorescent coatings which can be attained therewith when such suspensions are applied to the interior surface of the envelope of a fluorescent lamp.

Commercially available fluorescent lamps comprise an elongated tubular envelope having a pair of electrodes sealed into the opposite ends thereof. The envelope contains in gaseous atmosphere, which may be a mixture of a rare gas and a metal vapor, such as mercury vapor. The interior surface of the envelope is coated with a finely-divided fluorescent material which is exposed to the discharge between the electrodes, and is excited by ultra-violet radiations emitted by this discharge. The fluorescent coating is usually applied by suspending particulate fluorescent or phosphor material in a suitable binder, flushing the interior of the envelope with the suspension, permitting the excess suspension to drain out of the envelope, and then firing the interior wall of the coated envelope at a temperature which promotes adherence of the coating to the envelope walls and removes, generally by volatilization, the binder material. There results a phosphor film or coating adhered to the inside or interior surfaces of the tubular envelope.

Thus, in the course of manufacture, as well as during operation, of these fluorescent lamps, the phosphors used in these lamps experience a hostile environment. During manufacture, the lamp is baked at temperatures approximating 600°C which can cause serious degradation of some phosphors. While the lamp is operating, the phosphor is in a mercury vapor discharge where it is exposed to high-energy ultra-violet radiation, and is bombarded by electrons and mercury atoms. These factors may be responsible for maintenance losses, i.e., the time-dependent decrease in luminous flux found in all fluorescent lamps.

One method for improving brightness and maintenance is to shield the phosphor from these effects by coating the phosphor particles with a protective film, and numerous attempts have been made to protectively coat the particulate phosphor material by using selected additions to the coating suspension. Such additives include silica, boric anhydride, sodium borate, mixtures of barium and ammonium nitrates, crystalline alkali halides, calcium pyrophosphate, etc. These materials have several disadvantages as lamp phosphor coatings. The polycrystalline additions, by their very nature, cannot be expected to form an impervious film on the phosphors, therefore protection is incomplete. Of the glassy materials utilized, silica requires a very high temperature before it is fluid enough to coat the phosphor particles, whereas the other materials are not chemically compatible with most lamp phosphors and are not very resistant to attack by mercury vapor. In addition, since the phosphors are excited by the 254-nm line of the mercury discharge, the ultra-violet absorption of these glasses must be considered. For example, although boric anhydride, in the pure state, is quite transparent to ultraviolet radiation, additions, such as sodium which can migrate from the glass tubular envelope wall, cause the absorption edge to shift to longer wavelengths which could lead to absorption of the radiation required to excite the phosphor material.

In addition, it is well known that there is a tendency of the fluorescent coatings to chip or flake off the inside surface of the tubular envelope either during the manufacturing operation or during use. Various means have been proposed for improving the adherence of the fluorescent coating to the envelope walls. However, such techniques as have been proposed to date for use in conjunction with aqueous suspensions of the phosphor particles have not been completely satisfactory for a variety of reasons.

OBJECTS OF THE INVENTION

It is, therefore, the object of this invention to provide an improved fluorescent lamp.

It is a further object of this invention to provide a fluorescent lamp having a fluorescent coating firmly adhering to the interior wall of the tubular envelope.

It is a further object of this invention to provide a fluorescent lamp having a glassy phosphate coating on the phosphor particles which protects them from the environment in the lamp during use.

It is a further object of the present invention to provide a method for coating the interior wall of a tubular fluorescent lamp envelope with a fluorescent coating which improves the adherence of the phosphor to the envelope wall with little or no loss of brightness.

It is a further object of the invention to provide a method for coating phosphor particles on the interior wall of a tubular fluorescent lamp envelope in a manner which protects the phosphor particles from degradation that normally occurs during fabrication and operation of such a fluorescent lamp, but which will allow the phosphor to be fully excited by incident ultra-violet radiation generated during use.

Another object of this invention is to provide a novel aqueous suspension of phosphor particles suitable for coating the interior surface of the tubular envelope of a fluorescent lamp.

Yet a still further object of the present invention is to provide an aqueous suspension of phosphor particles and selected additive materials which will, in use according to the method of the present invention, provide a glassy phosphate coating on the phosphor particles to protect such particles from the environment generated in the fluorescent lamp during periods of use.

These and still further objects, features and advantages of the present invention will become apparent upon consideration of the following detailed disclosure.

BRIEF SUMMARY OF THE INVENTION

These and still further objects, features and advantages of the invention are achieved, in accordance therewith, by providing an aqueous suspension of phosphor particles containing an additive which will yield a phosphate glass upon firing. A suitable additive is, for example, ammonium dihydrogen phosphate. Other suitable additives include orthophosphoric acid, and the like. In order to obtain good adherence of the fluorescent coating to the envelope wall with minimum loss in brightness, the amount of the additive added to the aqueous suspension should be in the range from about 0.01 gram to about 0.5 gram of the additive (e.g., ammonium dihydrogen phosphate), preferably about 0.05 grams additive, per 100 grams of the phosphor material. The viscosity of the resultant suspension should be such that the material can be uniformly coated on the interior envelope wall, for example, about 90 centipoise.

During manufacture of the fluorescent lamp, the tubular envelope, after being coated with the aforementioned aqueous suspension, is dried, and then baked at approximately 600°C for a period of time sufficient to form a glassy phosphate film on the phosphor particle surface, generally for about one minute. It has been found that the manufacture of fluorescent lamps with the aqueous suspension described above, in accordance with the method described above, results in lamps having improved adherence of the phosphor coating to the fluorescent tube wall with little or no loss of brightness and, in some cases, an actual increase in the brightness of the treated phosphors.

In addition to the improved adherence of the phosphor coating to the envelope wall and the protection afforded to the particulate phosphor material by the glassy phosphate layer or matrix, a further advantage of the present invention is that these beneficial results can be attained with no additional processing steps. That is, by use of the aqueous suspensions herein described in place of prior art coating suspensions, according to conventional fluorescent lamp manufacturing techniques, the beneficial results described above are attained.

In one embodiment (see Example IV and V below), a ZnO – $P_2O_5$ glass coating is prepared by utilizing a combination of orthophosphoric acid and zinc nitrate. The atomic ratio of zinc to phosphorus can be between 0.1 to 0.5 with a presently preferred value of about 0.25 for calcium halophosphate phosphor. The amount of additive should be between $2 \times 10^{-3}$ and $2 \times 10^{-4}$ total moles $H_3PO_3$ and $Zn(NO_3)_2 \cdot 6H_2O$ per 100 g. phosphor. The presently preferred amount for additions to calcium halophosphate phosphor is about $9 \times 10^{-4}$ total moles $H_3PO_4$ and $Zn(NO_3)_2 \cdot 6H_2O$ per 100 g. phosphor. As with other suspensions described herein, the viscosity of the suspension should be, or adjusted to be, about 90 centipoise.

The suspensions of this invention have a relatively major amount of water, for example, about 50 to about 80 ml. per 100 grams of phosphor, a relatively major amount of the temporary vehicle, for example, about 60 to about 70 ml. per 100 grams of phosphor, and a minor amount of the additive as set forth above.

The present invention has numerous advantages over known, prior suspension coating techniques. Initially, the coating obtained herewith is chemically compatible with most lamp phosphors, and does not affect the oxidation state of activators-- in fact, the coating actually improves the degradation resistance during processing of phosphors with reduced valence state activators. The coating, consisting as it does of a low melting phosphate glass, easily forms an impervious layer that resists attack by metallic vapors, such as mercury vapor present in fluorescent lamps. The coating is transparent to ultra-violet radiation and, moreover, any impurities in the coating tend to improve its ultra-violet transmission, thus allowing full excitation by the ultra-violet radiation from the mercury discharging. Finally, as indicated above, the coating, being a low melting glass, aids in the adherence of the particulate phosphor material to the inside surface of the envelope wall, and these beneficial results can be attained by the herein described technique which requires no change in commercial lamp manufacturing production lines, other than the use of the aqueous suspensions herein described.

Since the vehicle for the suspension is water, the suspension is less hazardous to use than organic vehicle suspensions, based upon, for example, xylene, which is flammable and sufficiently toxic that breathing of its vapors and contact with the skin should be avoided.

The fluorescent lamps of the present invention can have the structure as shown, for example, in U.S. Pat. Nos. 2,151,496; 3,424,605; 3,424,606; or 3,435,271; the Figures of which, and the portions of the specification corresponding thereto, are incorporated herein by reference to the extent necessary to complete this specification. Such fluorescent lamps consist of a hermetically sealed tubular glass envelope coated on its inside surface with the powdered phosphor coating in accordance with the present invention, which converts the ultra-violet energy of a mercury arc discharge established through the center of the tube into visible light as it is absorbed by the phosphor layer during operation of the lamp. The bases at each end of the tubular envelope support electrical leads which are electrically connected to electrodes at each end of the lamp. The spaced electrodes can be coated with electron-emission promoting materials, such as mixtures of oxides containing a barium oxide, to facilitate operation of the lamp. During operation, a mercury droplet maintained within the sealed envelope is vaporized thereby causing the characteristic mercury discharge. Except for the nature of the phosphor coating, which is the subject of the present invention, construction of the fluorescent lamp is conventional.

The present invention also has applicability to the high pressure mercury vapor lamp shown in FIG. 2 of U.S. Pat. No. 3,435,271. Such a lamp has a radiation-transmitting outer envelope having a conventional screw-type base connected thereto. The improved adherent phosphor coating of the present invention can be coated on the inner surface of the outer envelope. An arc tube or inner sealed envelope can be supported within the outer envelope by means of a conventional supporting frame. A starting resistor connects a starting electrode of one side of the energizing potential, and, during operation, the mercury arc is sustained within the arc tube between spaced operating electrodes at each end of the arc tube. As with the fluorescent lamp described in the preceding paragraph, the construction of the lamp of this paragraph is conventional, with the exception of the coated phosphor layer which forms the subject matter of the present invention.

Any suitable phosphor can be utilized in the practice of the present invention. For example, halophosphates of alkaline earth metals, such as calcium, and activated with antimony alone or both antimony and manganese are suitable phosphor materials. Other suitable phosphors include, for example, zinc silicate activated with manganese, barium tatanium phosphate, etc.

The components of the suspension, including the phosphor particles, the binder, the phosphate-glass-yielding additive and the liquid components of the vehicle or carrier, are thoroughly mixed together, flowed over the inner surface of the glass envelope, dried and baked in a conventional manner at a temperature, generally about 600°C, for a few minutes, generally about one minute, in a manner sufficient to form a phosphate glass matrix or coating about, or around, the individual phosphor particles. The tubular envelope is then made into a lamp, in the usual manner, by sealing alkaline earth oxide activated, filimentary tungsten electrodes into the ends thereof, evacuating the envelope, filling the envelope with a small quantity of mercury and a starting gas, such as argon, at a few millimeters pressure, and then sealing the end(s) thereof.

The existence of the phosphate glassy coating about the particulate phosphor material has not actually been determined to be present by specific analysis. However, the improved adherence of the phosphor coatings to the envelope walls cannot be explained in the absence of such a glassy coating. Accordingly, the improved adherence is considered to be an indication that the desired phosphate glassy coating is, in fact, present.

DESCRIPTION OF SPECIFIC EMBODIMENTS

The following Examples are given to enable those skilled in this art to more clearly understand and practice the present invention. They should not be considered as a limitation upon the scope of the invention but merely as being illustrative and representative thereof.

In the following Examples, adherence of the phosphor coating to the coated substrate is evaluated by placing the coated substrate at a set and predetermined distance from a regulated air line, increasing the pressure of the air flow, and noting the air pressure when the coating is blown off. Brightness (luminosity) is measured by excitation with a filtered low-pressure mercury vapor lamp.

The phosphor numbers given in the Examples below are the identifying numbers utilized by GTE Sylvania Incorporated, from which company the phosphors were obtained.

EXAMPLE I

An aqueous phosphor coating suspension is prepared having various amounts of ammonium dihydrogen phosphates, as given below in Table I, 50 ml. distilled water and 66 ml. of the vehicle of Example VI per 100 grams of calcium halophosphate phosphor (cool white No. 4467). The phosphor is uniformly dispersed in the aqueous vehicle by bead milling with glass beads and the viscosity adjusted, with distilled water if necessary, to about 90 centipoise. The suspension is coated onto the interior surfaces of a tubular fluorescent envelope, the excess aqueous suspension material removed and the coated substrate fired at 600°C for about 1 minute. The relative brightness (luminosity) and adherence values are given in Table I below.

TABLE I

| Calcium Halophosphate (cool white, No. 4467) | | |
|---|---|---|
| Weight Percent $NH_4H_2PO_4$ | Luminosity (Relative) | Adherence (Relative PSI) |
| 0 | 100 | 100 |
| 0.01 | 100 | 110 |
| 0.10 | 97 | 170 |
| 0.50 | 98 | >400 |

EXAMPLE II

An aqueous phosphor coating suspension is prepared having various amounts of ammonium dihydrogen phosphate, as given below in Table II, 50 ml. of distilled water and 66 ml. of the vehicle of Example VI per 100 grams of zinc silicate:Mn (No. 2282). The phosphor is uniformly dispersed in the aqueous vehicle by bead milling with glass beads and the viscosity adjusted, with distilled water if necessary, to about 90 centipoise. The suspension is coated onto the interior surfaces of a tubular fluorescent envelope, the excess aqueous suspension material removed and the coated substrate fired at 600°C for about 1 minute. The relative brightness (luminosity) and adherence values are given in Table II below.

TABLE II

| Zinc Silicate:Mn (No. 2282) | | |
|---|---|---|
| Weight Percent $NH_4H_2PO_4$ | Luminosity (Relative) | Adherence (Relative PSI) |
| 0 | 100 | 100 |
| 0.01 | 93 | 100 |
| 0.10 | 99 | 130 |
| 0.50 | 97 | 440 |

EXAMPLE III

An aqueous phosphor coating suspension is prepared having various amounts of ammonium dihydrogen phosphate, as given below in Table III, 50 ml. of distilled water and 66 ml. of the vehicle of Example VI per 100 grams of barium titanium phosphate (No. 242). The phosphor is uniformly dispersed in the aqueous vehicle by bead milling with glass beads and the viscosity adjusted, with distilled water if necessary, to about 90 centipoise. The suspension is coated onto the interior surfaces of a tubular fluorescent envelope, the excess aqueous suspension material removed and the coated substrate fired at 600°C for about 1 minute. The relative brightness (luminosity) and adherence values are given in Table III below.

TABLE III

| Barium Titanium Phosphate (No. 242) | | |
|---|---|---|
| Weight Percent $NH_4H_2PO_4$ | Luminosity (Relative) | Adherence (Relative PSI) |
| 0 | 100 | 100 |
| 0.01 | 100 | 110 |
| 0.10 | 98 | 150 |
| 0.50 | 82 | 390 |

EXAMPLE IV

An aqueous suspension is prepared having the stated total moles of orthophosphoric acid and zinc nitrate, as given in Table IV below, 50 ml. of distilled water and 66 ml. of the vehicle of Example VI per 100 grams of calcium halophosphate phosphor. The orthophosphoric acid and zinc nitrate are used in a molar ratio of 4 : 1. The phosphor is uniformly dispersed in the aqueous vehicle by bead milling with glass beads and the viscosity adjusted, with distilled water if necessary, to about 90 centipoise. A tubular fluorescent envelope is coated with the aforementioned suspension (which gives, upon baking, a $ZnO$-$P_2O_5$ glass coating having good transmission properties), dried and baked at 600°C for about one minute. The effect of the additive on relative adherence of the fluorescent coating and brightness (luminosity) is given in Table IV below.

TABLE IV

Effect of the Amount of Addition (P/Zn = 4) to Calcium Halophosphate Phosphor

| Total Moles $H_3PO_3$ + $Zn(NO_3)_2$ per 100 g Phosphor × $10^4$ | Approximate Weight Percent Addition | Luminosity (Relative) | Adherence (Relative PSI) |
|---|---|---|---|
| 0 | 0 | 100 | 100 |
| 4.08 | 0.05 | 120 | 130 |
| 8.76 | 0.10 | 126 | 220 |
| 16.52 | 0.20 | 111 | 290 |
| 26.2 | 0.30 | 109 | 640 |
| 43.8 | 0.50 | 102 | 1100 |

EXAMPLE V

Example IV is repeated except the molar ratio of zinc nitrate to orthophosphoric acid is varied as given in Table V below. The relative adherence and brightness (luminosity) values for such phosphor coatings are also given in Tabel V below. The total number of moles of orthophosphoric acid and zinc nitrate is $16.52 \times 10^{-4}$ moles.

TABLE V

Effect of the Composition of the Addition (Total Addition about 0.2 Weight Percent)

| Molar Ratio of $Zn(NO_3)_2/H_3PO_3$ | Luminosity (Relative) | Adherence (Relative PSI) |
|---|---|---|
| 0 | 100 | 100 |
| 0.11 | 101 | 130 |
| 0.25 | 107 | 230 |
| 0.50 | 102 | 250 |

In Examples IV and V, not only is there an improvement in the relative adherence values but the relative brightness values increased as well, by as much as 26% in one instance, over the corresponding control. This is in comparison to the embodiments of Examples I-III where, although there was substantial improvement in the relative adherence values, the relative luminosity values decreased, in most instances, by approximately 1–3%, and, in other instances, by up to 18%. Total luminous flux from the lamps of Examples IV and V is about 10% below that obtained from lamps prepared with a conventional organic (i.e., xylene)-based suspension. Maintenance of these lamps, however, is comparable to that of the conventionally prepared lamps.

EXAMPLE VI

A vehicle suitable for use in the present invention is composed of the following components:

| | |
|---|---|
| Water | 6000 ml. |
| Isopropanol | 1200 ml. |
| Polyox WSRN - 750 (temporary organic binder) | 185 grams |
| Carbonax 200 (Plasticizer) | 50 ml. |
| Surfynol 104 (Anti-foaming agent) | 15 grams |

EXAMPLE VII

A further vehicle suitable for use in the present invention is composed of the following components:

| | |
|---|---|
| Water | 6000 ml. |
| Isopropanol | 1200 ml. |
| Polyox WSRN - 750 | 185 grams |
| Carbonax 200 | 50 ml. |
| Pluronic L61 (anti-foaming agent) | 15 grams |

The present invention is considered separate and distinct from the materials described in Great Britain Pat. No. 834,024, particularly Example 3 thereof. The first formulation described in that Example 3 does not have a temporary organic binder and thus is not suitable for use as a suspension for coating the interior envelope walls of a fluorescent lamp. As described, the first formulation is dried prior to the addition thereto of the organic vehicle. Thus, the phosphor coating suspension of that Example is actually an organic vehicle-based suspension distinctly different from the aqueous suspension of the present invention, as set forth in the claims appended hereto.

While the invention has been described with reference to specific embodiments thereof, it should be understood by those skilled in this art that various changes may be made without departing from the true spirit and scope of the invention. Various modifications may be made to adapt a particular situation, material, apparatus, process or then-present objective to the spirit of this invention without departing from its essential teachings.

What is claimed is:

1. An aqueous suspension comprising water; finely-divided phosphor particles; a temporary organic binder which can be essentially completely removed from a lamp envelope, on which the suspension has been coated, upon firing under appropriate conditions; and a minor amount of an additive which will yield a phosphate glass coating on said phosphor particles when a lamp envelope, on which the suspension has been coated, is fired under appropriate conditions, said additive comprising a mixture of orthophosphoric acid and zinc nitrate.

2. The suspension of claim 1 wherein said orthophosphoric acid and said zinc nitrate are each present in amounts such that the atomic ratio of zinc to phosphorus is about 0.1 to about 0.5.

3. The suspension of claim 1 wherein about 0.002 – 0.0002 moles of said orthophosphoric acid, and 0.00004 – 0.0004 moles of said zinc nitrate are added per 100 grams of said phosphor particles.

4. The suspension of claim 1 wherein said phosphate glass-yielding additive is present in an amount from about 0.01 gram to about 0.5 gram per 100 grams of said phosphor particles in said suspension.

5. The suspension of claim 1 wherein the viscosity thereof is about 90 centipoise.

* * * * *